United States Patent
Hansen

(10) Patent No.: US 10,642,745 B2
(45) Date of Patent: May 5, 2020

(54) KEY INVALIDATION IN CACHE SYSTEMS

(71) Applicant: salesforce.com, inc., San Francisco, CA (US)

(72) Inventor: Nick Hansen, Arvada, CO (US)

(73) Assignee: salesforce.com, inc., San Francisco, CA (US)

( * ) Notice: Subject to any disclaimer, the term of this patent is extended or adjusted under 35 U.S.C. 154(b) by 198 days.

(21) Appl. No.: 15/862,142

(22) Filed: Jan. 4, 2018

(65) Prior Publication Data

US 2019/0205255 A1 Jul. 4, 2019

(51) Int. Cl.
*G06F 12/00* (2006.01)
*G06F 12/0891* (2016.01)
*G06F 12/0875* (2016.01)
*G06F 12/0864* (2016.01)
*G06F 16/901* (2019.01)
*G06F 16/22* (2019.01)

(52) U.S. Cl.
CPC ...... *G06F 12/0891* (2013.01); *G06F 12/0864* (2013.01); *G06F 12/0875* (2013.01); *G06F 16/2246* (2019.01); *G06F 16/2255* (2019.01); *G06F 16/9014* (2019.01); *G06F 2212/608* (2013.01)

(58) Field of Classification Search
CPC ............. G06F 12/0891; G06F 16/2255; G06F 16/2246; G06F 16/9014; G06F 12/0864; G06F 12/0875; G06F 2212/608
USPC .......................................... 711/113, 118, 122
See application file for complete search history.

(56) References Cited

U.S. PATENT DOCUMENTS

| | | |
|---|---|---|
| 5,915,104 A | 6/1999 | Miller |
| 6,272,598 B1 | 8/2001 | Arlitt et al. |
| 7,124,249 B1 | 10/2006 | Darcy |
| 7,237,235 B2 | 6/2007 | Maeda |
| 7,480,657 B1 | 1/2009 | Glovin et al. |
| 7,711,705 B1 | 5/2010 | Patsenker et al. |
| 7,969,976 B2 | 6/2011 | Ishikawa et al. |
| 8,386,501 B2 | 2/2013 | Cahill et al. |
| 8,661,056 B1 | 2/2014 | Cinarkaya et al. |
| 8,849,825 B1 * | 9/2014 | McHugh ............. G06F 16/1873 707/737 |
| 8,935,480 B1 | 1/2015 | Chien et al. |
| 8,972,431 B2 | 3/2015 | Press et al. |
| 9,152,732 B2 | 10/2015 | Zearing et al. |
| 9,235,443 B2 | 1/2016 | Chockler et al. |
| 9,507,842 B2 * | 11/2016 | Knoll ................ G06F 16/24552 |
| 9,703,951 B2 | 7/2017 | Patel et al. |
| 2005/0044311 A1 | 2/2005 | Lahiri et al. |
| 2005/0251623 A1 | 11/2005 | Arimilli et al. |

(Continued)

*Primary Examiner* — Mardochee Chery
(74) *Attorney, Agent, or Firm* — Kowert, Hood, Munyon, Rankin & Goetzel, P.C.

(57) ABSTRACT

Techniques are disclosed relating to invalidating keys in a cache. In some embodiments, a computer system may implement a cache for a data store, where the cache stores a data set and is organized such that a stored data item of the data set is specified by a corresponding key having one or more portions. The computer system may store metadata for the cache, where the metadata includes nodes organized in a hierarchy. The computer system may receive a request to invalidate one or more keys of the cache, and may invalidate a particular node within the metadata based on a key value corresponding to the request.

20 Claims, 8 Drawing Sheets

(56) References Cited

U.S. PATENT DOCUMENTS

| | | |
|---|---|---|
| 2007/0011330 A1 | 1/2007 | Dinker et al. |
| 2009/0037495 A1 | 2/2009 | Kumar et al. |
| 2009/0198867 A1 | 8/2009 | Guthrie et al. |
| 2011/0138125 A1* | 6/2011 | Ekanadham .......... G06F 11/348 711/123 |
| 2012/0047332 A1 | 2/2012 | Bannon et al. |
| 2014/0006465 A1 | 1/2014 | Davis et al. |
| 2014/0143471 A1 | 5/2014 | Moyer et al. |
| 2014/0358988 A1* | 12/2014 | Howard .............. H04L 67/1095 709/203 |
| 2015/0074350 A1* | 3/2015 | Chiang ............... G06F 12/0808 711/118 |
| 2015/0095582 A1 | 4/2015 | Assarpour |
| 2015/0106560 A1 | 4/2015 | Perego et al. |
| 2016/0092318 A1 | 3/2016 | Ananthapadmanabh et al. |
| 2017/0052723 A1 | 2/2017 | Voigt et al. |
| 2017/0116124 A1* | 4/2017 | Sundaravaradan .......................... G06F 12/0815 |
| 2017/0116125 A1* | 4/2017 | Sundaravaradan .......................... G06F 16/24552 |
| 2017/0116130 A1* | 4/2017 | Sundaravaradan .......................... G06F 12/0888 |
| 2017/0116135 A1* | 4/2017 | Sundaravaradan .......................... G06F 16/9574 |

* cited by examiner

KEY INVALIDATION IN CACHE SYSTEMS

BACKGROUND

Technical Field

This disclosure relates generally to cache systems, and more specifically to invalidating keys in cache systems.

Description of the Related Art

A computer system may provide computing resources to numerous users. For example, a computer system may include application servers configured to host software applications for, as well as provide related data, code, and other information to, users of the computer system. In implementing the software applications for the users, the computer system may store data to, and read data from, a data store, such as a database. The process of storing and retrieving data to a data store, however, may be relatively slow, and may degrade the performance of the computer system.

In some instances, a computer system may implement a data cache to facilitate the storage and retrieval of data. For example, a data cache may store frequently-used or infrequently-changing data, from the data store, in a data cache at the application server. Implementing the data cache may allow for access to the cached data that is faster than retrieving that data from the data store. A data cache may be implemented using a key-value organization, such that a given key references a given data item stored in the data cache. In various instances, data stored in the data cache may need to be removed, e.g., based on eviction policies, changes to the underlying data at the data store, etc. In such instances, it may be desirable to invalidate the keys associated with the data being removed from the data cache.

DETAILED DESCRIPTION

Figure 1:
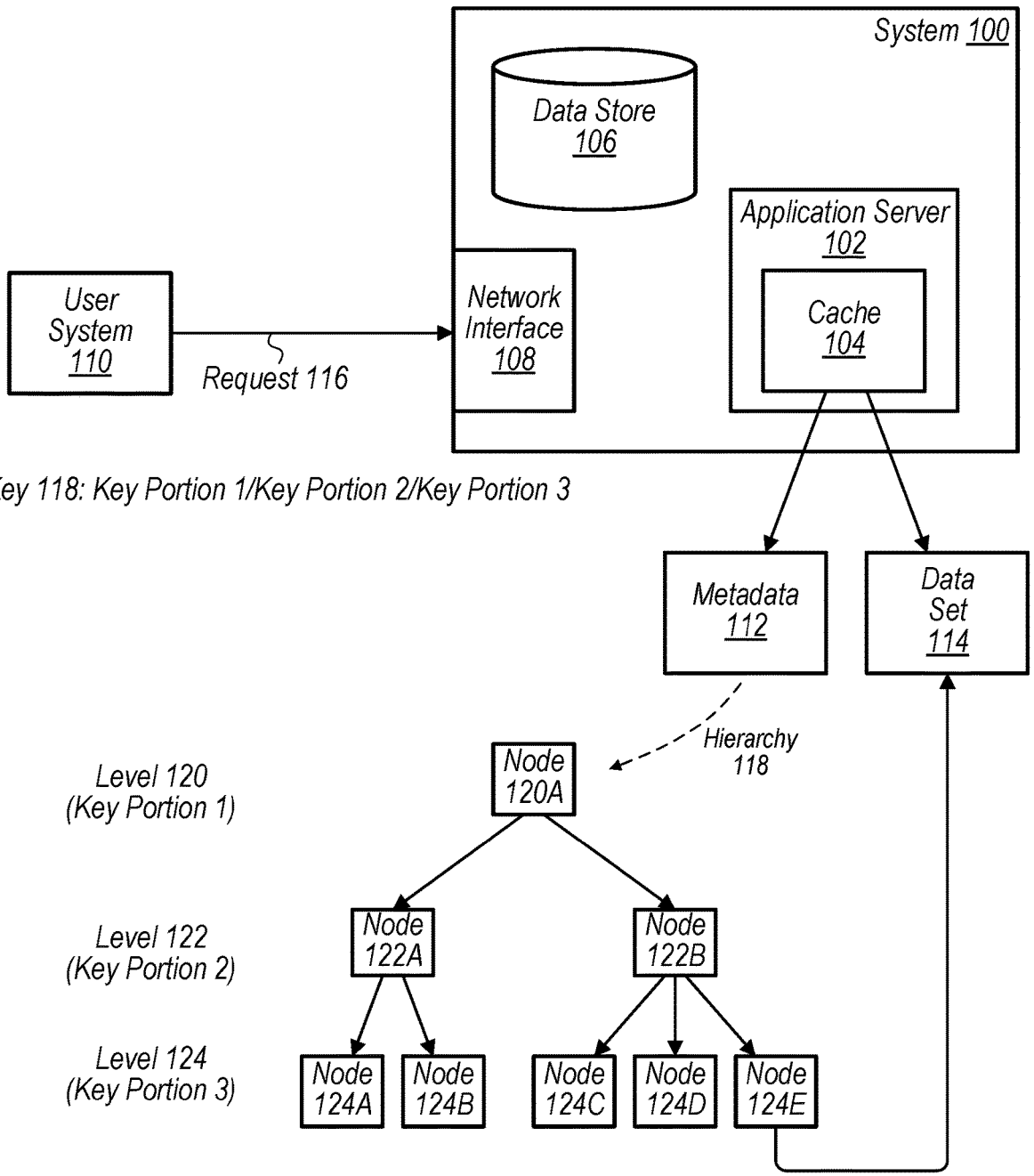
FIG. 1 is a block diagram illustrating an example system, according to some embodiments.

Referring to FIG. 1, a block diagram illustrating an example system 100 is depicted, according to some embodiments. As shown in FIG. 1, system 100 includes application server 102, data store 106, and network interface 108. In various embodiments, system 100 may be configured to provide computing resources to various users, such as a user of user system 110. For example, system 100 may be used to host software applications (e.g., using application servers 102) and store data (e.g., using data store 106) for various entities, such that the software applications and data may be remotely accessible to a given user of user system 110. As described in more detail below with reference to FIG. 6, in some embodiments, system 100 may be a multi-tenant computer system that provides computing resources for a plurality of tenants, each of which may include various users. Note that, although only one application server 102, data store 106, etc. are shown in FIG. 1 for clarity, other configurations of system 100 (e.g., such as a datacenter implementing numerous application servers and/or data stores) may be implemented according to various embodiments of this disclosure.

As part of providing computing resources, application server 102 may read data from data store 106. In various embodiments, however, the process of retrieving data from data store 106 may be relatively slow or computationally expensive. Thus, in some embodiments, application server 102 may include cache 104, which may facilitate faster retrieval of data relative to retrieving data from data store 106. For example, in some embodiments, system 100 may include a plurality of application servers 102, and cache 104 may be a distributed, in-memory cache configured to operate as a cache for one or more of the application servers 102 in the plurality. Further, in embodiments in which data store 106 is a multi-tenant data store, such as a multi-tenant database, the data set 114 stored by cache 104 may include data items for a plurality of tenants of the multi-tenant database system.

In various embodiments, cache 104 may be organized such that a data item stored in the data set is specified by a corresponding key. That is, cache 104 may be organized in a key-value manner such that a given key references (either directly or indirectly) a given data item stored in the data set. As discussed in more detail below with reference to FIG. 3A, the keys for cache 104 may be structured such that a given key has multiple portions, according to some embodiments. As one example, in embodiments in which system 100 is a multi-tenant computer system, the keys may include portions associated with a given tenant, a user associated with that tenant, a data object, etc. When a request is made (e.g., by a software application, user system 110, etc.) to retrieve data from cache 104, the requesting entity may specify the requested data item using the corresponding key. For example, as shown in FIG. 1, user system 110 may send a request 116 for a data item, where the request 116 includes a key 118 having one or more portions. In response to receiving the request, application server 102 may first check to see if the requested data item is stored in data set 114 of cache 104. If so, application server 102 may retrieve the requested data item from cache 104 and return it to user system 110. If the requested data item is not stored in cache 104, application server 102 may request the data from data store 106 and, depending on the cache policy in place for cache 104, may store the retrieved data in cache 104 with a corresponding key.

In various instances, data in data set 114 may need to be replaced, for example due to eviction policies for cache 104 (e.g., least recently used, etc.), changes in the underlying data stored by data store 106, etc. In such instances, the corresponding keys for the data to be replaced may need to be invalidated, such that the keys no longer reference the removed data items. In various embodiments, however, cache 104 may include a large number (e.g., millions) of keys, and the process of invalidating a large number of those keys may be time consuming. For example, in a conventional key-value index organization, cache 104 may have to scan through a high percentage of the keys for cache 104 to invalidate all of the relevant keys. Further, in some embodiments, cache 104 may be a single-threaded program such that cache 104 cannot service other requests (e.g., GET requests, PUT requests, etc.) while it is invalidating keys. Thus, in various embodiments, the process of atomically invalidating a large number of keys may be prohibitively slow, degrading the ability of system 100 to provide computing resources to users. According to various embodiments of the present disclosure, however, cache 104 may be configured to address these and other problems associated with the operation of cache 104.

As shown in FIG. 1, cache 104 may be configured to store metadata 112. In various embodiments, metadata 112 may include information indicative of the data set 114 stored by cache 104. That is, metadata 112 may self-describe the data stored by cache 104 such that information about the data stored in data set 114 may be inferred from the structure of metadata 112. For example, as shown in FIG. 1, metadata 112 may include a plurality of nodes organized in a hierarchy 118 in which different levels (e.g., levels 120-124) of the hierarchy 118 correspond to different portions of the corresponding keys for data set 114. As described in more detail below with reference to FIG. 3B, metadata 112 may include nodes organized according to various structures, such as a directed acyclic graph, a B-tree, B+ tree, binary search tree (BST), etc. Note that, although metadata 112 is stored by cache 104 in the embodiment depicted in FIG. 1, this embodiment is provided merely as an example and is not intended to limit the scope of the present disclosure. In other embodiments, for example, metadata 112 may be stored in a secondary memory source (not shown for clarity) available to application server 102.

In various embodiments, metadata 112 may be used to efficiently invalidate a large number of keys for cache 104, reducing the amount of time spent on the invalidation process. By more quickly and efficiently invalidating keys, cache 104 may be able to service other cache requests more quickly, improving the functioning of cache 104 and the operation of system 100 as a whole.

Consider, for example, an embodiment in which application server 102 receives a request to invalidate the following set of keys: 120A/122B/124C; 120A/122B/124D; and 120A/122B/124E. In a conventional system that does not implement metadata 112 as described herein, the process of invalidating the above-identified keys may require cache 104 to scan all or many keys in a key index associated with cache 104 to find the keys that match those patterns. Further, while cache 104 is scanning for these keys, other requests to cache 104 may be blocked from being performed.

According to the disclosed systems and methods, however, cache 104 may simply invalidate node 122B in hierarchy 118, which may in turn invalidate all keys that are based on node 122B. Stated differently, cache 104 may, based on one or more keys included in the request to invalidate, identify node 122B as being a "root node" in hierarchy 118 relative to a key portion that is common to all keys in the set. As used herein, the term "root node" is used to refer to a node in hierarchy 118 that is both at a higher level in hierarchy 118 than, and connected to, one or more child nodes of the root node. For example, with reference to hierarchy 118, note that the key portion 122B is present in each of the three keys that were requested to be invalidated, but is not present in other keys not in the set (e.g., keys based on node 122A). Additionally, note that node 122B is both at a higher level (e.g., level 122) than its child nodes 124C-124E (e.g., level 124) and is connected to each of its child nodes 124C-124E. In this way, node 122B may be referred to as a "root node" relative to the nodes 124C-124E. Thus, rather than scan all of the keys of cache 104 (such as keys based on node 122A) cache 104 may simply invalidate root node 122B, and all of the keys based on node 122B (e.g., keys 120A/122B/124C; 120A/122B/124D; and 120A/122B/124E) may be deemed invalidated.

Note that node 122B would not be considered a root node relative to nodes 124A or 124B because, while at a higher level in the hierarchy 118, node 122B is not connected to either of nodes 124A or 124B. The term "root node" is not used herein simply to refer to the top node in hierarchy 118. Instead, as explained in more detail below with reference to FIG. 3B, hierarchy 118 may include multiple root nodes relative to different parts of the hierarchy 118. Therefore, the term "top root node" is used herein to refer to the top node within hierarchy 118, as to distinguish the top root node from root nodes relative to different portions of hierarchy 118.

In various embodiments, invalidating the set of keys may result in subsequent requests for data items associated with the set of keys (e.g., a GET request that specifies key 120A/122B/124C) results in a cache miss. Note, however, that invalidating a given key within cache 104 does not render the given key "invalid" indefinitely. For example, subsequent to key 120A/122B/124C being invalidated, cache 104 may store a new data item in data set 114 with 120A/122B/124C as the corresponding key.

The disclosed systems and methods may provide various improvements to the function of cache 104, as well as improve the operation of system 100 as a whole. For example, when invalidating a large number of keys (e.g., all keys associated with a user, a tenant, a software application, etc.) for cache 104, the disclosed systems and methods may utilize metadata 112 to invalidate those keys in a manner that is faster and more computationally efficient than conventional approaches. Rather than scanning all keys associated with cache 104, the disclosed systems and methods may identify and invalidate a root node within hierarchy 118 relative to a key portion that is common to the keys being invalidated. In various embodiments, this may result in the quicker invalidation of the keys for cache 104, which may, in turn, permit application server 102 and cache 104 to better service requests for computing resources from users of system 100.

Figure 2:
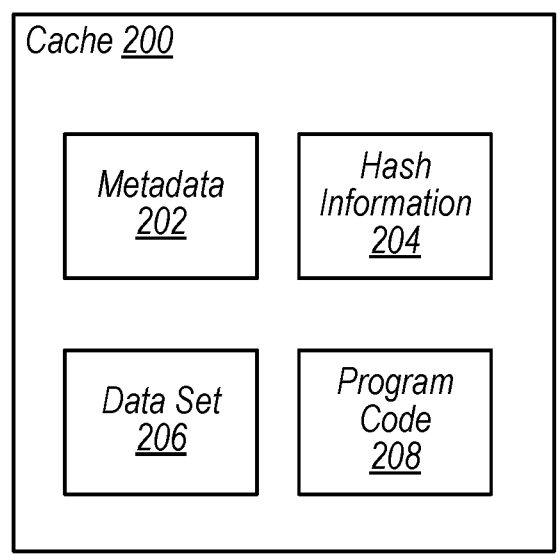
FIG. 2 is a block diagram illustrating an example cache, according to some embodiments.

Turning now to FIG. 2, a block diagram illustrating an example cache 200 is depicted, according to some embodiments. As shown in FIG. 2, cache 200 includes metadata 202, hash information 204, data set 206, and program code 208. In various embodiments, cache 200 of FIG. 2 may correspond to cache 104 of FIG. 1. For example, data set 206 may correspond to data set 114, and may include data that corresponds to data stored by a data store 106 of FIG. 1. Additionally, metadata 202 may correspond to metadata 112 of FIG. 1, and may include information indicative of the data set 206 stored by cache 200. The organization of metadata 202 will be discussed in more detail below with reference to FIG. 3B.

Cache 200 further includes hash information 204. As described in more detail below with reference to FIG. 4A, hash information 204 may be used, in conjunction with the keys stored in metadata 202, to identify data items stored in data set 206. That is, in some embodiments, a given key may point to a given hash value included in hash information 204, and the given hash value may, in turn, point to a given data item in data set 206.

Cache 200 further includes program code 208. In various embodiments, program code 208 may be executable to "rebuild" or "replenish" data items in the data set 206 of cache 200. That is, a user may provide program code 208 that, when executed, is operable to perform operations (e.g., retrieve data from data set 206, manipulate the retrieved data, etc.) to generate a data item corresponding to a particular key. For example, subsequent to invalidating one or more keys of cache 200, it may be desirable to preemptively store updated data in data set 206, such that subsequent cache requests may result in a cache hit, rather than being required to retrieve the requested data from data store 106. Note that, in some embodiments, the process of replenishing the data set 206 may be performed "in the background," that is, while cache 200 is not servicing other requests. In one embodiment, a user (such as an administrator associated with a given tenant of multi-tenant system 100, according to some embodiments) may provide program code 208 that may be operable to generate a value for a key when the value for that key is null or otherwise unavailable.

For example, in some embodiments, in response to a request for a data item associated with a particular key, cache 104 may first determine whether a valid (e.g., non-expired) data item is stored in data set 206 for that particular key. If so, the requested data item may be retrieved and provided to the requesting user or application. If not, however, cache 104 may determine whether there is program code 208 associated with the particular key stored by cache 200. If there is, that program code 208 may be retrieved and executed to generate the data item associated with the particular key. For example, in one embodiment, program code 208 associated with the particular key may be stored as a byte array in hash information 204, and the byte array may be fetched and de-serialized to produce executable program code 208 that specifies operations to generate the value for a provided key.

Further, in some embodiments, subsequent to invalidating a set of keys, cache 200 may retrieve program code 208 associated with a given key of the set of keys. Application server 102 may then execute program code 208, where executing may include retrieving data from data store 106, according to some embodiments. For example, in some embodiments, executing program code 208 may include replaying API calls that were previously used to build the data in data set 206. Having retrieved the data item for the given key from data store 106, application server 102 may store the retrieved data item in cache 200 and may update metadata 202 to include one or more nodes in the hierarchy corresponding to the given key. Further, in some embodiments, this process of executing program code 208 to replenish a value for a given key may be repeated, such as for each of the keys previously invalidated, in response to keys of cache 200 expiring, etc.

Note, however, that in some embodiments, it may be desirable to limit the rate at which cache 200 is replenished via program code 208. For example, consider a situation in which cache 200 has invalidated a large number of keys (e.g., 10,000), as described herein. In such a situation, attempting to immediately replenish the values for each of the invalidated keys may be computationally expensive. Further, as noted above, cache 200 may be a single-threaded program, according to various embodiments, and the attempt to replenish cache 200 may result in a prolonged interruption of service for users of system 100, similar to a denial-of-service (DoS) attack. Thus, in various embodiments, the rate at which the data for the invalidated keys are replenished may be limited, e.g., based on tenant-specific policy rules, the availability of cache 200 or application server 102 to perform such operations, policy rules implemented by an operator of system 100, etc.

Figure 3A:
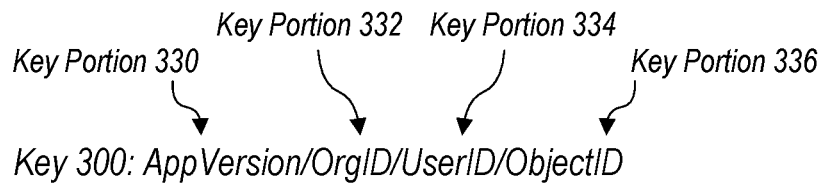
FIG. 3A depicts example keys associated with a cache, according to some embodiments.

Referring now to FIG. 3A, example keys associated with a cache are shown, according to some embodiments. More specifically, FIG. 3A includes keys 300, 310, and 320. Key 300 depicts a basic format of a key, with multiple portions 330-336, that a given cache 104 may utilize, while keys 310 and 320 depict example keys according to the format of key 300, in accordance with one embodiment.

As noted above, system 100 may be a multi-tenant computer system that provides computing resources for a plurality of users associated with a plurality of tenants, according to some embodiments. In such embodiments, the keys for cache 104 may be formatted to reflect the multi-tenant nature of system 100 and data store 106. For example, as shown in FIG. 3A, key 300 includes four portions: key portion 330 corresponding to an application version, key portion 332 corresponding to an organization identifier, key portion 334 corresponding to a user identifier, and key portion 336 corresponding to an object identifier. The format of key 300 may be used to specify a data item stored in a data set 114 of cache 104 in such a multi-tenant computer system, according to some embodiments. Note that, although four portions are shown in the format of key 300, this format is provided merely as an example and keys with more or less key portions may be implemented in a cache 104, according to various embodiments.

Keys 310 and 320 depict two example keys that utilize the format shown in key 300. Keys 310-320 may be used, for example, to specify two data items stored in data set 114 of cache 104. For example, key 310 ("AppVersion40/OrgID1/UserID1/ObjectID1") may be used to specify a first data item associated with a first user of a first tenant of a multi-tenant system. Similarly, key 320 ("AppVersion40/OrgID2/UserID2/ObjectID2") may be used to specify a second data item associated with a second user of a second tenant of the multi-tenant system.

Figure 3B:
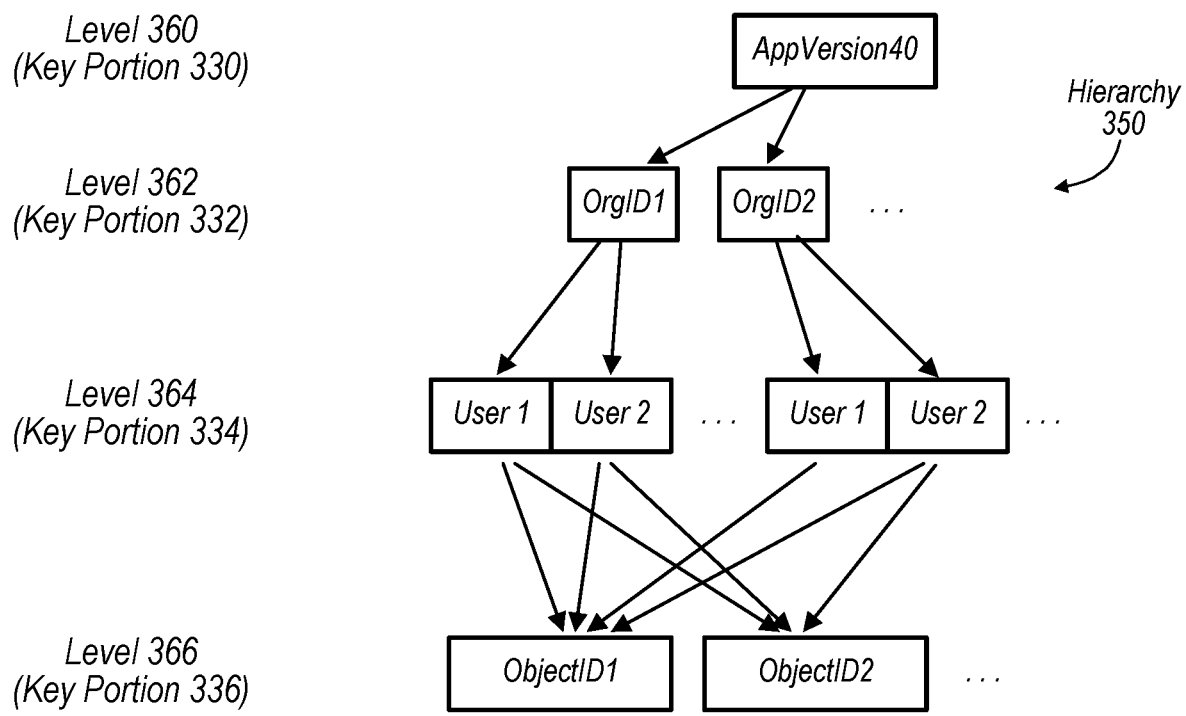
FIG. 3B depicts an example hierarchy of nodes, according to some embodiments.

Turning now to FIG. 3B, an example hierarchy 350 is shown, according to some embodiments. In various embodiments, hierarchy 350 may correspond to hierarchy 118 of FIG. 1, and may be stored on cache 104 of system 100. In the embodiment depicted in FIG. 3B, hierarchy 350 corresponds to a logical organization of nodes corresponding to the different portions of key 300. That is, as shown in FIG. 3B, hierarchy 350 includes four levels 360-366, where each level of the hierarchy 350 corresponds to a different portion 330-336 of key 300.

As used herein, the term "hierarchy" is used to refer to a parent/child organizational structure for nodes that correspond to portions of keys for a cache. For example, in various embodiments, the nodes of hierarchy 350 may be organized such that different levels of the hierarchy 350 correspond to different portions of the corresponding keys, such as keys 310-320 of FIG. 3A. One of ordinary skill in the art with the benefit of this disclosure will recognize, however, that embodiments of the present disclosure may implement hierarchy 350 using various data structures. For example, in some embodiments, hierarchy 350 may include a directed acyclic B tree graph, capable of having multiple child nodes for various nodes in the graph. In such embodiments, a given leaf node of the tree may include a pointer to a given hash value, which may be usable to retrieve a given data item from data set 114, as described in more detail below with reference to FIG. 4A. In other embodiments, however, the organization structure of hierarchy 350 may vary, for example, based on the format of the keys used the particular cache 104. For example, in some embodiments, hierarchy 350 be structured as a B+ tree, a BST, or any other suitable structure such that the invalidation of a single node within hierarchy 350 may invalidate multiple keys associated with that node.

In various embodiments, hierarchy 350 may be used to efficiently invalidate a large number of keys of cache 104, reducing the total amount of time spent on the invalidation process. For example, consider an instance in which cache 104 receives a request to invalidate all keys associated with a first tenant of the multi-tenant system. For the purposes of this example, assume that the first tenant is represented in hierarchy 350 by the "OrgID1" node, and the users associated with the first tenant are represented by the "User 1," "User 2," etc. nodes shown below the OrgID1 node. In such a situation, rather than scanning through all of the keys associated with data set 114, cache 104 may identify the OrgID1 node as the root node in hierarchy 350 for the first tenant. Cache 104 may then invalidate the OrgID1 node, such that a subsequent data request for a data item associated with the first tenant results in a cache miss within cache 104. For example, if, immediately after having invalidated the OrgID1 node, cache 104 received a request for a data item specified by the key "AppVersion40/OrgID1/UserID1/ObjectID1," cache 104 may traverse hierarchy 350 and, upon finding the OrgID1 node invalidated, determine that the requested data item is not stored in cache 104. Stated differently, cache 104 may invalidate the OrgID1 node, for example by removing the OrgID1 node from hierarchy 350, such that the nodes beneath the OrgID1 node (e.g., the User 1 node) may also be considered invalidated.

By invalidating the single OrgID1 node, cache 104 may invalidate four keys (e.g., "AppVersion40/OrgID1/UserID1/ObjectID1," "AppVersion40/OrgID1/UserID1/ObjectID2," "AppVersion40/OrgID1/UserID2/ObjectID1," and "AppVersion40/OrgID1/UserID2/ObjectID2"). Note that, in some implementations of system 100, a given tenant may have many (e.g., thousands) of users and, in such implementations, invalidation of a root node for the first tenant may result in the efficient invalidation of a large number (e.g., millions) of keys.

Similarly, consider an embodiment in which cache 104 receives a request to invalidate keys for all data items associated with a first user (e.g., "User 1") of a first tenant of the multi-tenant system. In such an embodiment, cache 104 may identify the "User 1" node, associated with the "OrgID1" node, as the root node in hierarchy 350 for the first user. In such an embodiment, cache 104 may invalidate the "User 1" node such that a subsequent data request for a data item associated with the first user results in a cache miss within cache 104.

Note that the invalidation of a node within hierarchy 350 may be performed according to various techniques. For example, in one embodiment, invalidating a given node in hierarchy 350 may include setting a flag of a particular field associated with the given node. This embodiment, however, is provided merely as an example and any suitable method for invalidating a node in hierarchy 350 may be used in various embodiments, such as deleting the given node from metadata 112, removing pointers from the given node to any child nodes, etc.

Further note that, although FIGS. 3A and 3B have been described in the context of a multi-tenant system, this embodiment is provided merely as an example. One of ordinary skill in the art with the benefit of this disclosure will recognize that the disclosed systems and methods are not limited to multi-tenant systems and may be implemented in other environments (e.g., client/server environments, cloud computing environments, etc.) as desired.

Figure 4A:
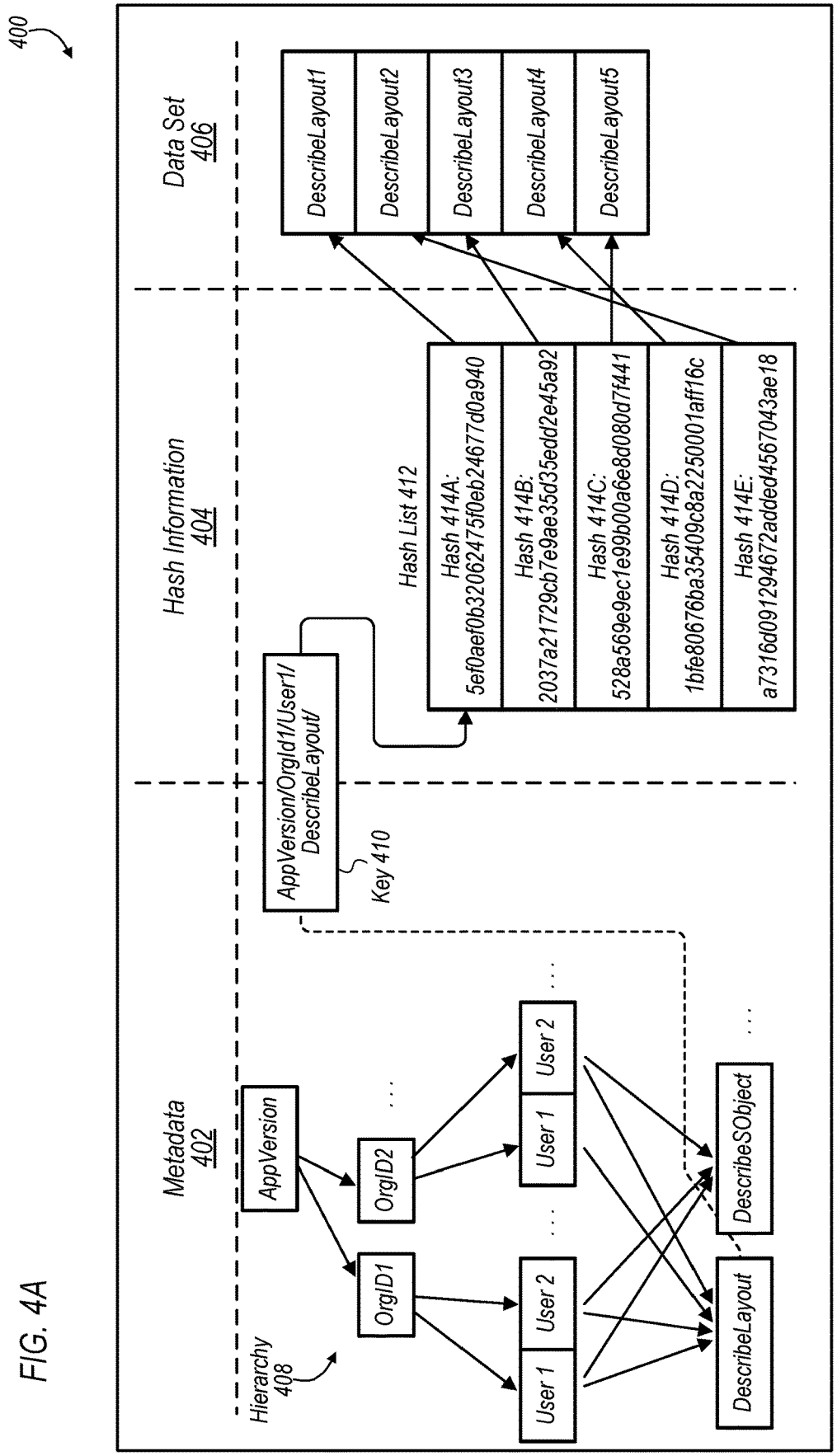
FIGS. 4A and 4B depict example block diagrams corresponding to a cache, according to some embodiments.

Referring now to FIG. 4A, an example block diagram 400 depicting various aspects of a cache is shown, according to some embodiments. In the embodiment of FIG. 4A, block diagram 400 includes sections for metadata 402, hash information 404, and data set 406, which may correspond to metadata 202, hash information 204, and data set 206, respectively, of FIG. 2.

Block diagram 400 depicts the relationship between metadata 402, hash information 404, and data set 406 in the operation of a cache, such as cache 200, according to various embodiments. As discussed above, a given data item stored in data set 406 may be specified by a corresponding key. For example, key 410 ("AppVersion40/OrgID1/UserID1/DescribeLayout") may be a key that specifies a data item associated with a data object (e.g., a "DescribeLayout" object) that is, potentially, stored in data set 406. Using this key, hierarchy 408 may be traversed to both determine whether the requested data item is stored in the cache 200 and, if so, retrieve the requested data item. In various embodiments, keys in metadata 402 may point to hash values 414 in hash information 404. The hash values 414, in turn, may then point to the actual data items in data set 406. For example, in some embodiments, hierarchy 408 may be a tree structure (e.g., a directed acyclic B-tree) where a given leaf node of the tree structure includes a pointer to a given hash value 414, where the given hash value is usable to retrieve a requested data item in data set 406. As shown in table 400, key 410 points to hash 414A, which points to the requested data item ("DescribeLayout1") in data set 406.

Figure 4B:
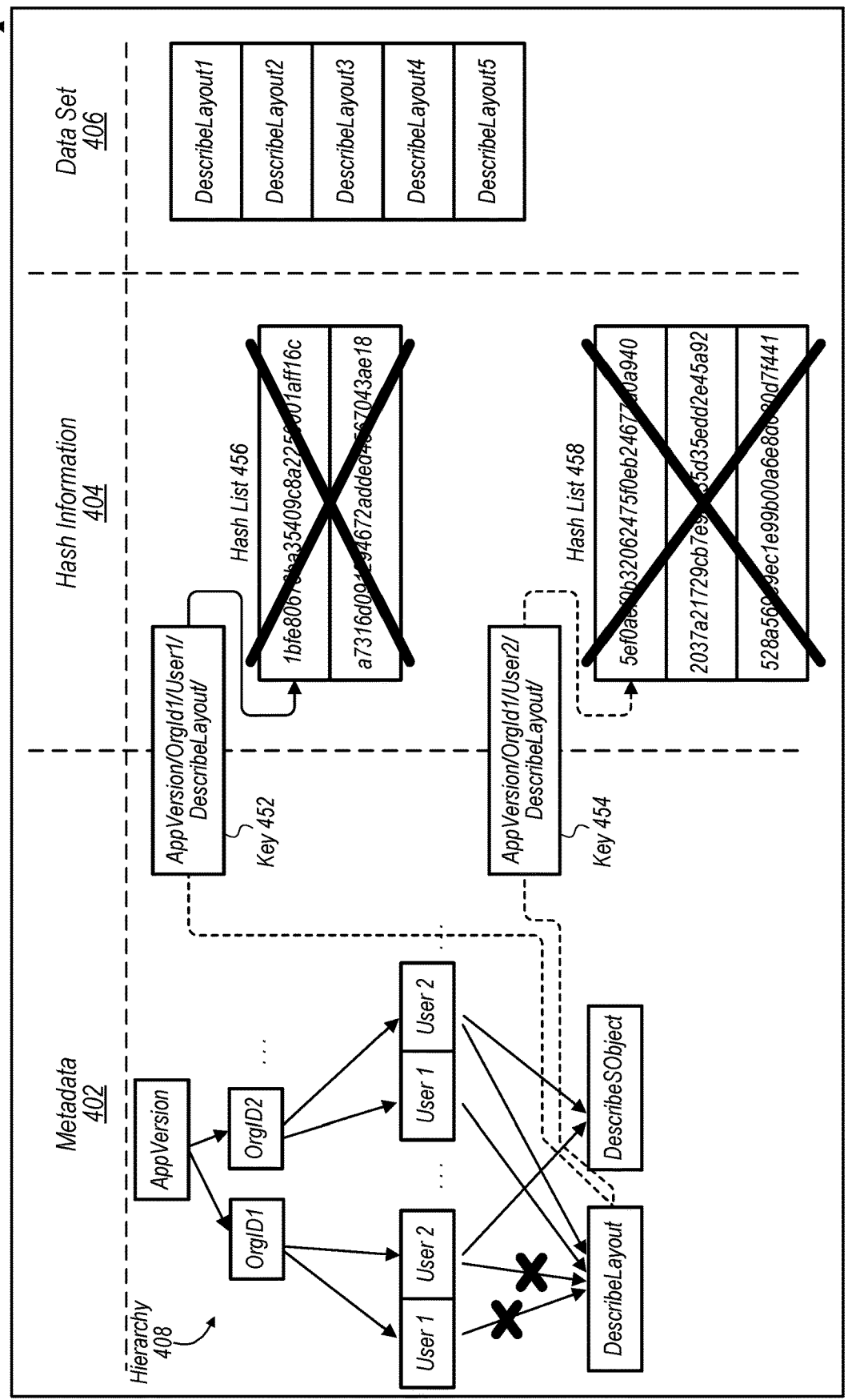

Turning now to FIG. 4B, an example block diagram 450 corresponding to a cache is shown, according to some embodiments. In FIG. 4B, block diagram 450 depicts the relationship between metadata 402, hash information 404, and data set 406 in an embodiment in which a node of hierarchy 408 has been invalidated.

In the depicted embodiment, the "DescribeLayout" node associated with a first tenant has been invalidated. This node may be invalidated for various reasons. For example, in one embodiment, a user (e.g., an administrator) associated with the first tenant may make a change to a data object associated with a layout of a software application (e.g., the DescribeLayout object). Upon making this change, the data associated with the previous version of this data object that is stored in data set 406 may be stale, and thus may need to be replaced. Accordingly, the keys in metadata 402 associated with the stale data items for the DescribeLayout data object may need to be invalidated. Note, however, that this embodiment is provided merely as an example and is not intended to limit the scope of this disclosure. In other embodiments, for example, cache 104 may receive a request to invalidate keys associated with a given software application, a given version of a software application, a given namespace, a user or set of users, etc.

In FIG. 4B, the "DescribeLayout" node may be invalidated such that the keys (e.g., keys 452 and 454) associated with this data object, for the first tenant, no longer point to hashes in hash lists 456 and 458, which in turn may prevent the corresponding data items stored in data set 406 from being retrieved using the keys 452-454. Thus, in various embodiments, the invalidation of a single node within hierarchy 408 may result in the invalidation of multiple keys for cache 200.

Note, however, that other keys associated with the "DescribeLayout" node may still be valid for data items in cache 200, according to some embodiments. For example, data items associated with a second tenant (represented in hierarchy 408 by the "OrgID2" node) may also correspond to a DescribeLayout data object associated with the second tenant. Note that, in various embodiments, data objects for different tenants may vary such that, despite having the same name and being specified by a similar key, the underlying data for those data object may be different for a first tenant than for a second tenant. Thus, in such embodiments, the modification of the "DescribeLayout" object for the first tenant may not affect the "DescribeLayout" object for the second tenant, such that the second tenant's data for that data object may not need to be removed from data set 406 due to the first tenant's modification. Accordingly, in such embodiments, a key associated with the "DescribeLayout" object for the second tenant (e.g., AppVersion40/OrgID2/UserID2/DescribeLayout) may still point to a hash value in hash information 404, which may, in turn, point to a data item in data set 406.

Figure 5:
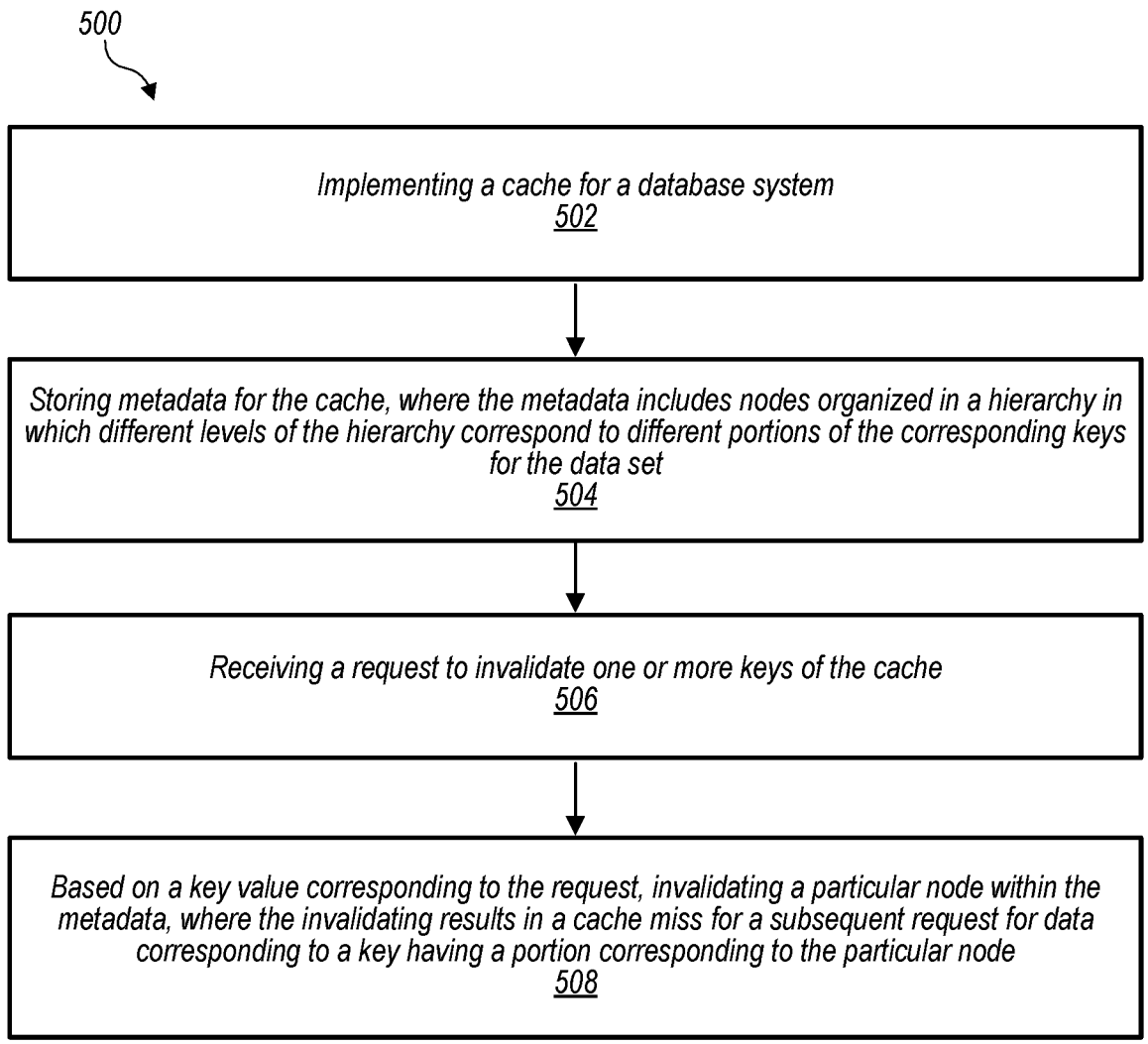
FIG. 5 is a flow diagram illustrating an example method for invalidating one or more keys of a cache, according to some embodiments.

Referring now to FIG. 5, a flow diagram of an example method 500 for invalidating one or more keys of a cache is shown, according to some embodiments. In various embodiments, method 500 may be implemented, for example, by one or more application servers 102 in system 100 of FIG. 1. FIG. 5 includes blocks 502-508. While these blocks are shown in a particular order for ease of understanding, other orders may be used.

Block 502 includes implementing a cache for a database system. For example, in some embodiments, application server 102 may implement a cache 104 for data store 106. In some embodiments, cache 104 may store a data set corresponding to data stored by data store 106. For example, in some embodiments, it may be desirable to store in cache 104 data from data store 106 that is used frequently, data that changes infrequently, etc. In various embodiments, the data set stored by cache 104 may be organized such that a stored data item of the data set is specified by a corresponding key having one or more portions.

Method 500 then proceeds to block 504, which includes storing metadata for the cache, where the metadata includes nodes organized in a hierarchy in which different levels of the hierarchy correspond to different portions of the corresponding keys for the data set. For example, the stored metadata may include nodes organized in a hierarchy. A hierarchy (such as hierarchy 350 of FIG. 3B) may be organized such that different levels of the hierarchy correspond to different portions of the keys for the cache.

Method 500 then proceeds to block 506, which includes receiving a request to invalidate one or more keys of the cache. For example, in one embodiment, an administrator of a given tenant may update a particular object (e.g., an object associated with the layout of a software application). In such an embodiment, the data stored in cache 104 for that particular object for the given tenant may no longer be valid. Accordingly, the keys of cache 104 that point to the stored (now stale) data may need to be invalidated, and the request of block 506 may correspond to a request to invalidate one or more keys associated with that particular data object, according to one embodiment.

Method 500 then proceeds to block 508, which includes, based on a key value corresponding to the request, invalidating a particular node within the metadata, where the invalidating results in a cache miss for a subsequent request for data corresponding to a key having a portion corresponding to the particular node. Note that, in some embodiments, invalidating the particular node may include identifying the particular node as a root node in the hierarchy relative to a key portion that is common to all keys in the set of keys being invalidated, and then invalidating that particular node. For example, referring to the example discussed above with reference to FIG. 1, in response to a request to invalidate a set of keys (e.g., keys 120A/122B/124C; 120A/122B/124D; and 120A/122B/124E) method 500 may include identifying node 122B as a root node relative to nodes 124C-124E. Method 500 may then include invalidating the particular node, which in turn may invalidate the set of keys such that subsequent requests for data items associated with the set of keys (e.g., a request including the key 120A/122B/124C) results in a cache miss.

Further, in some embodiments, method 500 may include, subsequent to invalidating the set of keys, deleting data items corresponding to the set of keys from the data set. For example, subsequent to invalidating the set of keys (e.g., keys 120A/122B/124C; 120A/122B/124D; and 120A/122B/124E), cache 104 may delete the data items associated with those invalidated keys from data set 114.

Figure 6:
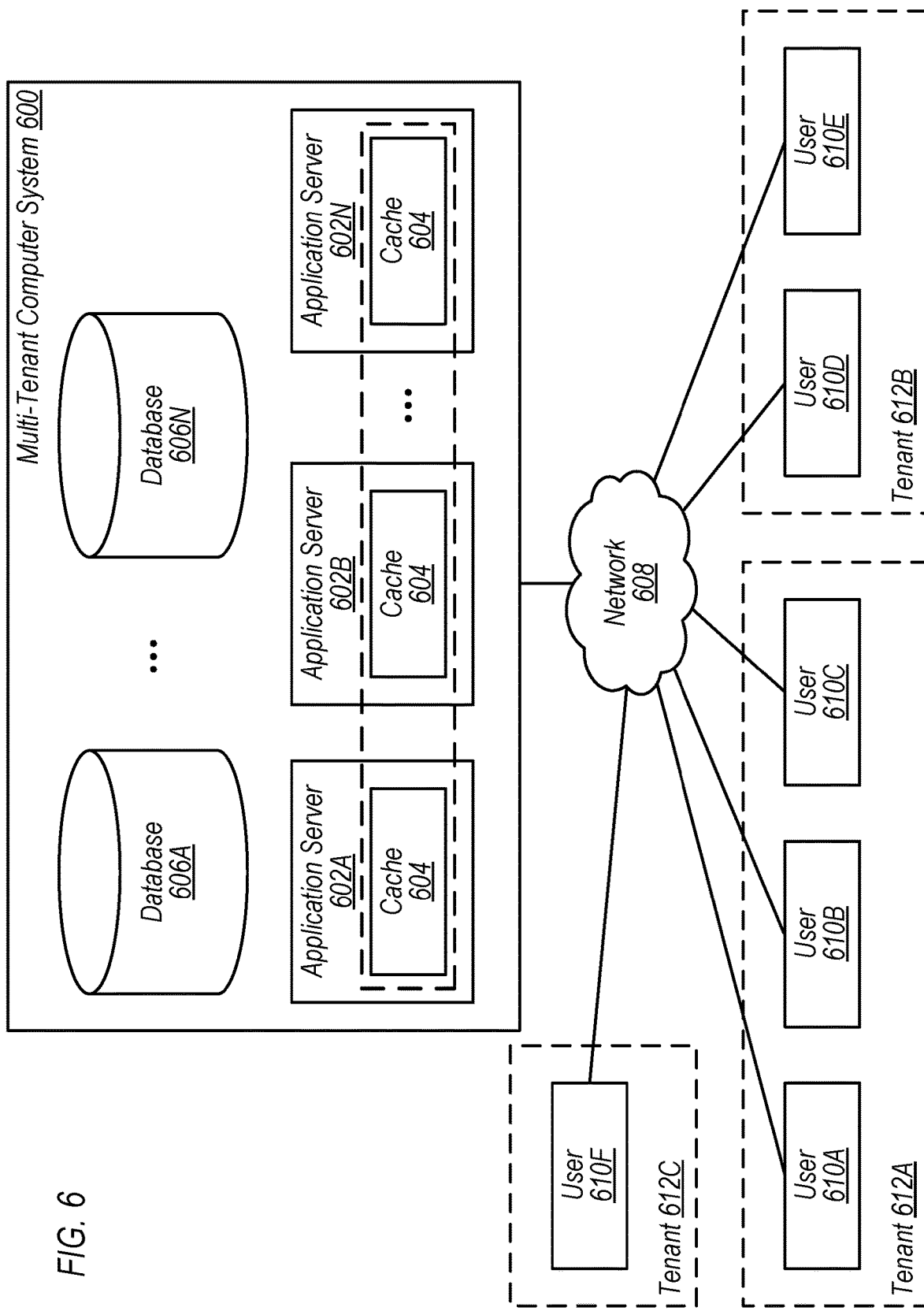
FIG. 6 is a block diagram illustrating an example multi-tenant computing system, according to some embodiments.

Turning now to FIG. 6, a block diagram illustrating an example multi-tenant computing system (MTCS) 600 is shown, according to some embodiments. In some embodiments, MTCS 600 may correspond to system 100 of FIG. 1. As shown in FIG. 6, MTCS 600 includes application servers 602 and databases 606. In the embodiment of FIG. 6, databases 606 may be multi-tenant database systems configured to store data for a plurality of tenants associated with MTCS 600.

In various embodiments, MTCS 600 may be configured to provide computing resources to various users 610 associated with various tenants 612 of MTCS 600. For example, MTCS 600 may host software applications (e.g., using application servers 602) and store data (e.g., via multi-tenant database systems 606) for a plurality of tenants 612 such that users 610 associated with the tenants 612 may access the software applications and data via network 608. Network 608 may be a LAN (local area network), WAN (wide area network), wireless network, point-to-point network, star network, token ring network, hub network, or any other appropriate configuration. In various embodiments, tenant data (e.g., stored in databases 606 or cache 604) may be arranged such that the data of one tenant (e.g., tenant 612A) is kept separate from the data of another tenant (e.g., tenant 612C) such that the separate tenants do not have access to the other's data, unless such data is expressly shared.

As shown in FIG. 6, MTCS 600 further includes cache 604. In various embodiments, application servers 602 may be configured to implement cache 604 to facilitate faster access to data stored by databases 606. For example, in some embodiments, cache 104 may be a distributed, in-memory cache implemented by one or more application servers 602 and configured to store data associated with various tenants 612 of MTCS 600. In various embodiments, access to data stored in cache 604 may vary, for example based on the user requesting the data, the nature of the requested data, etc. For example, in some embodiments, a data item stored to cache 604 may only be accessible to the user for which that data item was initially stored. Further, in some embodiments, the data items stored in cache 604 associated with a given tenant may be accessible to all users associated with the given tenant, a subset of the users associated with the given tenant, etc. Further still, in some embodiments, some data items may be accessible to users in different tenants, such as user 610C associated with tenant 612A and user 610D associated with tenant 612B. Access to data stored in cache 604 may be determined, for example, by tenant-specific policy rules, system-wide policy rules implemented for some or all of the tenants associated with MTCS 600, etc.

Example Computer System

Figure 7:
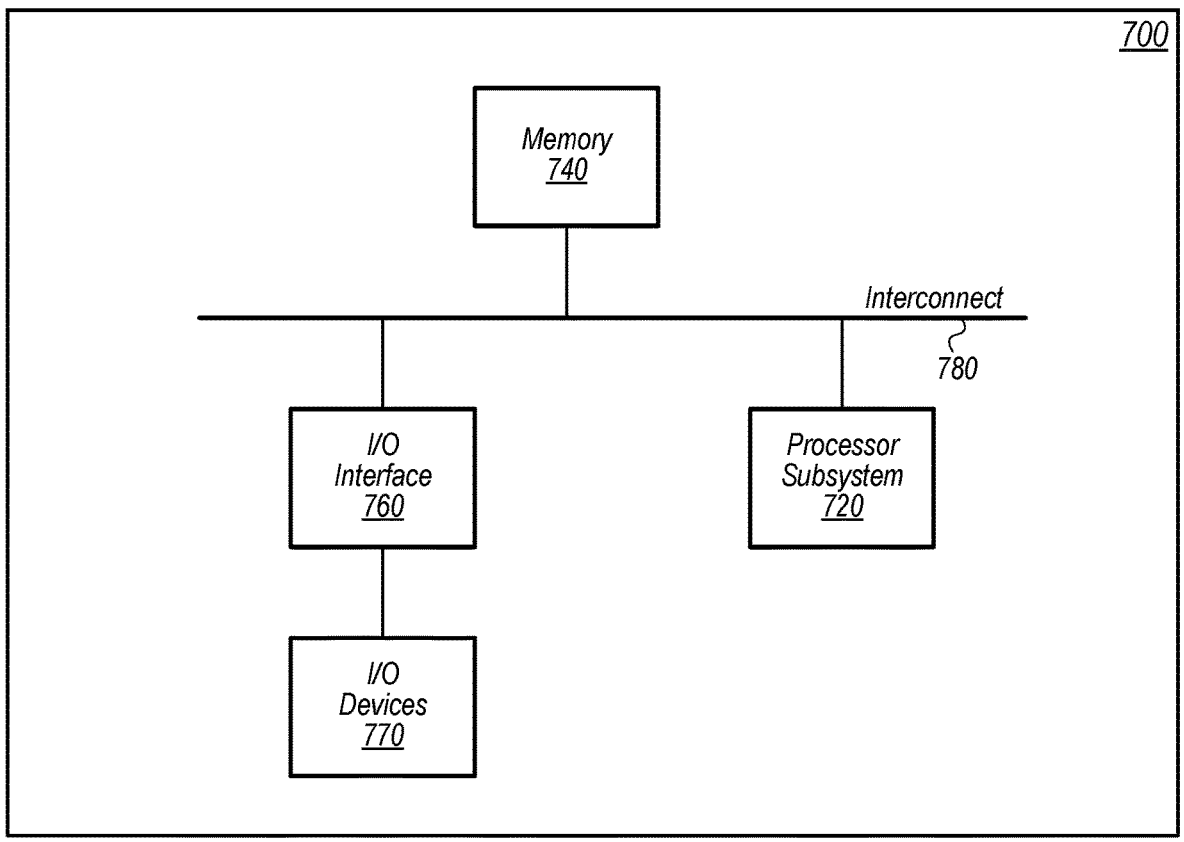
FIG. 7 is a block diagram illustrating an example computer system, according to some embodiments.

Referring now to FIG. 7, a block diagram of an example computer system 700 is depicted, which may implement one or more computer systems, such as an application server 102 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a multi-tenant computer system, the terms "first tenant" and "second tenant" may be used to refer to any two tenants of the multi-tenant computer system.

When used in the claims, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   implementing, by a computer system, a cache for a database system, wherein the cache stores a data set and is organized such that data items of the data set are specified by corresponding keys having one or more portions;
   storing, by the computer system, metadata for the cache, wherein the metadata includes nodes organized in a hierarchy in which different levels of the hierarchy correspond to different portions of the corresponding keys for the data set;
   receiving, by the computer system, a request to invalidate one or more keys of the cache; and
   based on a key value corresponding to the request, invalidating, by the computer system, a particular node within the metadata, wherein the invalidating results in a cache miss for a subsequent request for data corresponding to a key having a portion corresponding to the particular node.

2. The method of claim 1, wherein the database system is a multi-tenant database system, and wherein the data set includes data items for a plurality of tenants of the multi-tenant database system.

3. The method of claim 2, wherein the request to invalidate one or more keys is a request to invalidate keys for all data items associated with a first tenant of the multi-tenant database system.

4. The method of claim 3, further comprising:
   identifying within the hierarchy, by the computer system, a root node for the first tenant; and
   invalidating, by the computer system, the root node for the first tenant such that a subsequent request for a data item associated with the first tenant results in a cache miss within the cache.

5. The method of claim 2, wherein the request to invalidate one or more keys is a request to invalidate keys for all data items associated with a first user of a first tenant of the multi-tenant database system.

6. The method of claim 5, further comprising:
   identifying within the hierarchy, by the computer system, a root node for the first user associated with the first tenant; and
   invalidating, by the computer system, the root node for the first user such that a subsequent request for a data item associated with the first user results in a cache miss within the cache.

7. The method of claim 1, wherein the metadata includes the nodes structured as a directed acyclic graph.

8. The method of claim 7, wherein the directed acyclic graph is arranged as a tree structure; and wherein a given leaf node of the tree structure includes a pointer to a given hash value, wherein the given hash value is usable to retrieve a given data item of the data set.

9. The method of claim 1, wherein the particular node is a root node in the hierarchy relative to a portion that is common to each of the one or more keys; and wherein invalidating the one or more keys of the cache is performed without scanning all keys associated with the cache.

10. A non-transitory, computer-readable medium having computer instructions stored thereon that are capable of being executed by a computer system to cause operations comprising:
    implementing a cache for a database system, wherein the cache stores a data set and is organized such that data items of the data set are specified by corresponding keys having one or more portions;
    storing metadata for the cache, wherein the metadata includes nodes organized in a hierarchy in which different levels of the hierarchy correspond to different portions of the corresponding keys for the data set;
    receiving a request to invalidate one or more keys of the cache; and
    based on a key value corresponding to the request, invalidating a particular node within the metadata, wherein the invalidating results in a cache miss for a subsequent request for data corresponding to a key having a portion corresponding to the particular node.

11. The non-transitory, computer-readable medium of claim 10, wherein the request to invalidate the one or more keys is a request to invalidate all keys for data items associated with a given application.

12. The non-transitory, computer-readable medium of claim 10, wherein the database system is a multi-tenant database system, and wherein the data set includes data items for a plurality of tenants of the multi-tenant database system.

13. The non-transitory, computer-readable medium of claim 12, wherein the request to invalidate one or more keys is a request to invalidate keys for all data items associated with a first tenant of the multi-tenant database system.

14. The non-transitory, computer-readable medium of claim 13, further comprising:
identifying within the hierarchy, by the computer system, a root node for the first tenant; and
invalidating, by the computer system, the root node for the first tenant such that a subsequent request for a data item associated with the first tenant results in a cache miss within the cache.

15. The non-transitory, computer-readable medium of claim 12, wherein the request to invalidate one or more keys is a request to invalidate keys for all data items associated with a first user of a first tenant of the multi-tenant database system.

16. The non-transitory, computer-readable medium of claim 15, further comprising:
identifying within the hierarchy, by the computer system, a root node for the first user associated with the first tenant; and
invalidating, by the computer system, the root node for the first user such that a subsequent request for a data item associated with the first user results in a cache miss within the cache.

17. A method, comprising:
maintaining, by a computer system, a distributed cache that stores a data set corresponding to a data store, wherein the cache is organized such that data items of the data set are specified by corresponding keys having one or more portions;
storing, in the cache, metadata corresponding to the cache, the metadata including a plurality of nodes organized in a hierarchy in which different levels of the hierarchy correspond to different portions of the corresponding keys for the data set;
receiving, by the computer system, a request to invalidate a set of keys of the cache;
identifying, by the computer system based on a key value associated with the request, a particular node in the metadata, wherein the particular node is a root node in the hierarchy relative to a portion that is common to all keys in the set of keys; and
based on the particular node, invalidating, by the computer system, the set of keys of the cache such that subsequent requests for data items specified by the set of keys results in a cache miss.

18. The method of claim 17, further comprising:
subsequent to invalidating the set of keys, retrieving, by the computer system, program code associated with a first key of the set of keys;
executing, by the computer system, the program code, wherein the executing includes retrieving data from the data store;
storing, by the computer system, the retrieved data in the cache; and
updating, by the computer system, the metadata to include one or more nodes in the hierarchy corresponding to the first key.

19. The method of claim 17, further comprising:
subsequent to invalidating the set of keys, the computer system deleting, from the data set, data items corresponding to the set of keys.

20. The method of claim 17, wherein the data set stored by the cache includes data items for a plurality of tenants; and wherein the request to invalidate the set of keys is a request to invalidate all keys associated with a first tenant of the plurality of tenants.

* * * * *